US008621602B2

(12) United States Patent
Rijnswou Van et al.

(10) Patent No.: US 8,621,602 B2
(45) Date of Patent: Dec. 31, 2013

(54) ONE-TIME AUTHENTICATION SYSTEM (75) Inventors: Sander Matthijs Rijnswou Van, Veldhoven (NL); Jan Rene Brands, Nijmegen (NL)

(73) Assignee: NXP B.V., Eindhoven (NL)

( * ) Notice: Subject to any disclaimer, the term of this patent is extended or adjusted under 35 U.S.C. 154(b) by 1398 days.

(21) Appl. No.: 11/629,154

(22) PCT Filed: May 31, 2005

(86) PCT No.: PCT/IB2005/051768
§ 371 (c)(1), (2), (4) Date: Aug. 16, 2007

(87) PCT Pub. No.: WO2005/122071
PCT Pub. Date: Dec. 22, 2005

(65) Prior Publication Data
US 2008/0109899 A1 May 8, 2008

(30) Foreign Application Priority Data
Jun. 9, 2004 (EP) .................................... 04102617

(51) Int. Cl.
*G06F 21/00* (2013.01)
(52) U.S. Cl.
USPC ............... 726/21; 713/168; 713/193; 380/30; 380/247; 380/270; 455/411
(58) Field of Classification Search
USPC .......................................................... 726/21
See application file for complete search history.

(56) References Cited

U.S. PATENT DOCUMENTS

| 5,140,634 | A | | 8/1992 | Guillou et al. |
| 5,237,609 | A | * | 8/1993 | Kimura ......................... 713/193 |
| 5,644,638 | A | | 7/1997 | Thiriet |
| 5,719,560 | A | | 2/1998 | Watkins |
| 7,131,036 | B2 | * | 10/2006 | Wray et al. ................... 714/38.1 |
| 7,900,045 | B2 | * | 3/2011 | Rager et al. ................... 713/168 |
| 8,112,626 | B1 | * | 2/2012 | Adler et al. ................... 713/168 |

(Continued)

FOREIGN PATENT DOCUMENTS

| EP | 0552392 A1 | 1/1992 |
| WO | 95/12852 A1 | 5/1995 |

OTHER PUBLICATIONS

The BiBa OneTime Signature and Broadcast Authentication Protocol|http://bluecoat-01/?cfru=aHR0cDovL2NpdG-VzZWVyeC5pc3QucHN1LmVkdS92aWV3ZG9jL2Rvd25sb2- 2FkP2RvaT0xMC4xLjEuMTcuNTM2MCZyZXA9cmVwMSZ- 0eXBlPXBkZg==|Adrian Perrig| 2001|Pages 1-10.*
International Search Report, PCT/IB2005/051768, Mar. 16, 2006.

*Primary Examiner* — Mahfuzur Rahman (57) ABSTRACT

An authentication system includes a plurality of electronic tags (120, 122, 124) that are each associated with a respective unique identity ID. The tags include a memory (220) with a first memory location (222) for storing a pre-computed challenge and a second memory location (224) for storing a pre-computed response that is associated with the challenge. The first memory location (222) is non-readable from outside the tag. An access circuit (210) only provides the response after having received a challenge that matches the challenge stored in the first memory location. A reader station (110) obtains the identity associated with a tag. It then determines a corresponding challenge and sends the challenge to the tag. It receives a response from the tag and verifies the authenticity of the tag by comparing the received response to a response that corresponds to the challenge.

8 Claims, 6 Drawing Sheets

(56) References Cited

U.S. PATENT DOCUMENTS

| | | | |
|---|---|---|---|
| 2004/0066278 A1* | 4/2004 | Hughes et al. | 340/10.1 |
| 2004/0143737 A1* | 7/2004 | Teicher | 713/167 |
| 2005/0061875 A1* | 3/2005 | Zai et al. | 235/383 |
| 2005/0105734 A1* | 5/2005 | Buer et al. | 380/270 |
| 2005/0149740 A1* | 7/2005 | Kotzin et al. | 713/185 |
| 2005/0235150 A1* | 10/2005 | Kaler et al. | 713/168 |
| 2005/0246760 A1* | 11/2005 | Kaler et al. | 726/1 |

* cited by examiner

| ID-1 | Chal-1 | Resp-1 |
|---|---|---|
| ID-2 | Chal-2 | Resp-2 |
| ID-3 | Chal-3 | Resp-3 |
| ... | ... | ... |
| ID-n | Chal-n | Resp-n |

ONE-TIME AUTHENTICATION SYSTEM

The invention relates to an authentication system including a plurality of electronic tags and at least one reader station for verifying an authenticity of an electronic tag. The invention further relates to an electronic tag for use in such a system.

Smart tag systems are currently used in applications ranging from public transport, road toll and passenger tickets to airline baggage tagging. In the future much more products, such as clothes or super market products, are expected to become equipped with a smart tag. Increasingly, in such applications the communication between the tag reader and the smart tag is done in a contactless manner. This improves processing time and accuracy and reduces queuing times. Such tags are also sometimes referred to as RF-ID (Radio Frequency Identification).

The hardware capabilities of the various smart tags on the markets are very diverse. Some of these electronic tags can only store data that can be read by the tag reader (comparable to a barcode). An example of such a tag is the Philips Semiconductors MIFARE® ultralight. Different types of memory may be used by such a tag, including read-only, write-once, and re-writeable (e.g. EE-PROM, Flash) memory. Other tags offer advanced cryptographic protection. For example, the Philips Semiconductors MIFARE® PROXrange is based on a secure 8-bit 80C51 core. It offers a sophisticated memory protection scheme with customized parameters to secure on-chip memory, and an advanced memory management unit to protect applications securely. The MIFARE® PROXICs are based on highly-integrated process technologies and design methods, making the chips extremely resistant to any kind of physical analysis. The data is protected using a triple-DES coprocessor. The MIFARE® PROXPKI controllers also include an embedded 32-bit crypto coprocessor optimized for Public Key algorithms such as RSA or ECC.

The difference in processing power between the different kinds of smart tags results in a significant difference in cost. The security offered by the simple tags is relatively low, since the data is not protected cryptographically. This makes it possible for fraudulent parties to fake/simulate a genuine tag, e.g. by obtaining an original reader and tag, reading the data from the tag and observing the interaction between the reader and the tag. It is then relatively simple to simulate a genuine tag, for example using a PDA (Personal Digital Assistant) equipped with hardware, such as an antenna, for RF communication with the reader, and a program that lets the PDA behave as a genuine tag. Such an effort would not be worthwhile if the advantages obtained by using such a fraudulent tag would be low and/or the chances of detection are high. The chances of detection can be increased by additional security measures, like visual inspection checks of the tag. However, many of such detection systems take a considerable effort and are thus not always suitable.

For certain applications the security offered by the simple tags is not sufficient. On the other hand, the additional costs of a tag with a cryptographic processor may not be justified. This is, for instance, the case in an application as an admission ticket to a pop concert or a soccer match. In such applications an electronic tag can be used to control admission to the event, i.e. only people that have paid are entitled to enter. Additionally, security requirements to guarantee everyone's safety are quite stringent.

A well-known way to do authentication is by using a cryptographic challenge-response protocol. This requires the implementation of one (or more) cryptographic algorithms at the side of both the tag reader and the smart tag itself. Doing this would turn a simple smart tag into a complicated, and more expensive, smart tag.

It is an object of the invention to provide an authentication system and electronic tag of the kind set forth that is capable of distinguishing fake smart tags from genuine ones, i.e., to authenticate the tags without requiring a cryptographic processor in the tag. It is a further object of the invention to provide an electronic tag for use in such a system.

To meet an object of the invention, an authentication system includes a plurality of electronic tags and at least one reader station for verifying an authenticity of an electronic tag; each of the electronic tags being associated with a respective unique identity and including a memory including a first memory location for storing a pre-computed challenge and in a second memory location for storing a pre-computed response that is associated with the challenge; the first memory location being non-readable from outside the tag; and an access circuit for only providing the response stored in the second memory location in response to receiving a challenge that matches the challenge stored in the first memory location; each of the reader stations being operative to, for an electronic tag, obtain the associated unique identity; determine for the identity a corresponding challenge; send the challenge to the tag; receive a response from the tag; and verify the authenticity of the tag by comparing the received response to a response that is associated with the challenge.

By adding to the smart tag the possibility to perform a simple authentication protocol the tag reader is able to distinguish genuine smart tags from fake ones, based on a cryptographic challenge-response system, The required values for a cryptographic check are pre-computed and stored on the tag. These pre-computed values have to be kept secret to make the authentication work. To prevent the smart tag from accidentally releasing the secret data, it only sends the response if the correct challenge has been sent to it by the reader. So a malicious reader can not easily obtain the response in order to create a copy of the tag. The challenge is based on the unique identification (ID) associated with the tag. By ensuring that only a genuine reader can generate the challenge for this ID, a mutual authentication of both the smart tag and the tag reader is achieved. No cryptographic processing is required in the tag, making the tag very low cost. The response may be associated with the challenge through a conventional challenge-response protocol. It is also possible to have another association between the challenge and response. For example, both may be random numbers. The random numbers are stored in the tag and the reader has access to the random numbers and can locate them based on the tag ID.

The system gives the conventional level of cryptographic security that a first tag associated with a given ID is genuine. By eavesdropping into the communication between the tag and the reader it may be possible that fake tags are produced/simulated afterwards. If the tag can only be used once (e.g. at the entrance gate), the system is cryptographically fully secure. This can be achieved easily, for instance by the entrance system recording which tags have already been used and refusing entrance to a copy (i.e. tag associated with the same ID). For systems where security requirements are moderate it may be acceptable that some copies in theory can be produced. Additional steps can be made to reduce a chance of this happening. For example, if the tag would be used for entrance to a major event, the time in between a first valid tag entering and the last person entering is very limited, eliminating the chance of mass scale copying. The chances of simulating a tag using devices such as a PDA can be reduced by a simple visual inspection of the tag.

According to some embodiments, the memory of the electronic tag includes a third memory location for storing the unique identity associated with the tag; the third location being of a read-only type; the reader being operative to obtain the unique identity associated with an electronic tag by reading the identity from the memory of the tag. In this way, the reader can obtain the unique ID in a simple and reliable way and based on the ID perform the challenge-response. Preferably, the ID is loaded in the tag during manufacturing in a way that it can not be tampered with (ensuring that the ID stays unique in the sense that no ordinary tag can be easily modified, e.g. by writing the ID, to have the ID of another tag). Any scheme for obtaining unique IDs may be used. As an alternative to manufacturing fully unique IDs, also tags may be produced with group IDs that are unique for a group of tags, e.g. used for one event. The tags of such a group can then be made fully unique by adding a further identification, such as a serial number that uniquely identifies the tags within the set. Such additional ID may be written into the tag, followed by locking the storage location with this additional ID to a read-only form. The combination of the two IDs then creates a unique ID for all possible tags of all sets.

According to some embodiments, the memory includes a fourth memory location for storing a challenge; the fourth memory location being writeable from outside the tag; the access circuit being arranged to, in response to a read access to the second memory location from outside the tag, compare the challenge stored in the fourth memory location to the challenge stored in the first memory location and to only provide the response stored in the second memory location if the comparison yields a match. In this arrangement, the tag fully behaves like a memory making the operation very simple. The challenge is written to a memory location and the response is read from a memory location. Only if the written challenge matches the already stored, pre-computed challenge is the response actually provided.

According to some embodiments, the first and second memory location are of a write-once type; the system further including an activator operative to, for an electronic tag:
 obtain the associated unique identity;
 determine for the identity a corresponding challenge;
 store the challenge in the first memory location of the electronic tag;
 determine a response that is associated with to the challenge based on the predetermined cryptographic algorithm; and
 store the response in the second memory location of the tag.

In principle, the activation may occur already during the manufacturing. In a preferred embodiment, activation is a separate step, for example to allow activation per event. In such a situation, the associated challenge-response pairs can be chosen per event. For example, using one challenge-response algorithm that is considered secure, per event a different key may be chosen. In this way it is sufficient that IDs are unique per event (i.e. set of tags for one purpose), the challenge-response algorithm can make the response unique for the event and challenge. It will be appreciated that the challenge should be write-once and the response conditionally readable as described above. This can be achieved by storing the challenge and response in memory locations that can be locked by the activator for undesired operations. Preferably, the locking is automatic in response to a value being written to the memory location. In such a way the chances can be reduced that due to a non-completed activation the challenge and/or response would be readable.

According to some embodiments, the corresponding challenge for the identity is determined using a further predetermined cryptographic algorithm operating on at least the identity and a cryptographic key. Not only does this produce secure challenges, it also makes it possible to just store this algorithm and the key in the reader to make the reader operational for all tags of the system. The cryptography can also be used to create two unique numbers (challenge and response), e.g. by creating two pseudo-random numbers, and use these as the challenge and associated response. An alternative approach to storing the algorithm and key would be to store all challenges (or even all challenge-response pairs) that are possible in the system in association with the IDs (e.g. using a table). For systems with a large number of tags this latter approach requires more storage. Preferably any sensitive data/operations can be performed in a secure manner, for example using cryptographic smart cards.

According to some embodiments, the access circuit is arranged to provide access from outside the tag to the response stored in the second memory location a maximum of one time. In this way a one-time authentication system is created that is cryptographically secure. It will be appreciated that for certain systems no such stringent requirements are required. Such systems may use a counter (for example in the reader and/or the tag) that limits the number of uses to a predetermined number of times, e.g. 3 times. These systems would not be fully secure (it can not be prevented that a second or further use of the tag is actually performed by a fraudulent tag) but may be acceptable for certain applications, also in view of other conditions (e.g. visual checks, limited duration of an event, etc.)

According to some embodiments, the memory includes a plurality of pairs of memory locations; each pair including a respective first memory location for storing a predetermined challenge and a respective second memory location for pair storing a predetermined response that is associated with the challenge in the first memory location of the same pair; each of the first memory locations being non-readable from outside the tag; the access circuit being arranged to provide the response stored in the second memory location of a pair only in response to receiving a challenge that matches the challenge stored in the first memory location of the same pair. In this way a tag is created that is secure for several operations (for as many operations as there are memory pairs). Many applications can benefit from such a tag. One use could be an electronic public transport ticket that can be used several times for a same type of trip (each time using up one memory location pair) or that uses a zone-mechanism, where a user pays per zone. In the latter system, each memory location pair may correspond to a zone traveled by the user. Many other applications can also benefit from such a tag, for example where a user has to pay per product/service obtained. For example, each time a user buys a drink at a bar one memory pair is used. At the end of the evening the user then pays at the checkout. The checkout checks how many memory locations have been used and charges accordingly. It is also possible to use such tags in pre-paid applications, where each time the user uses product/service one memory pair is used. The high level of security coupled to the low cost of the tag open up many new applications.

According to some embodiments, the pairs of memory locations are sequentially arranged and the access circuit is operative, starting with a first one of the memory pairs, each time a response has been provided in response to a received challenge, select a sequentially next pair for a subsequent access operation. In this way, the reader does not need to administrate which memory pair can be used or check which pair is still unused. The tag takes care of it itself. It will be appreciated that any data required by the tag (e.g. a counter) needs to be stored securely in the tag preventing re-writing from outside the tag.

To meet an object of the invention, an electronic tag for use in the authentications system is associated with a unique identity and includes:

a memory including a first memory location for storing a pre-computed challenge and a second memory location for storing a pre-computed response that corresponds to the challenge based on a predetermined cryptographic algorithm; the first memory location being non-readable from outside the tag; and an access circuit for only providing the response stored in the second memory location in response to receiving a challenge that matches the challenge stored in the first memory location.

These and other aspects of the invention are apparent from and will be elucidated with reference to the embodiments described hereinafter.

Figure 1:
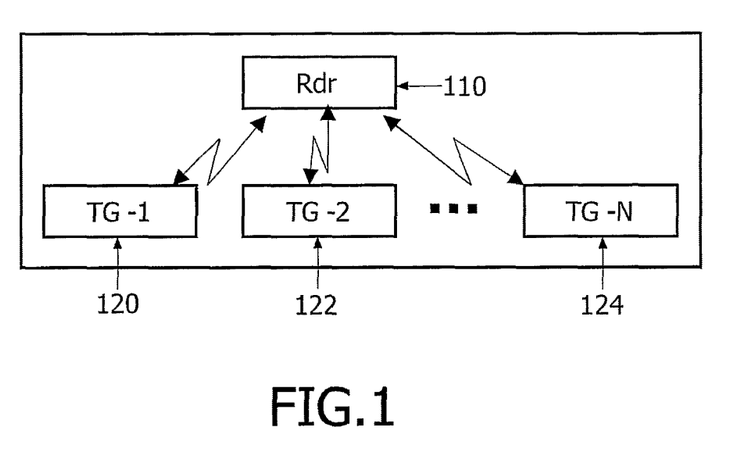
FIG. 1 shows a block diagram of the system according to the invention.

FIG. 1 shows a block diagram of the system 100 according to the invention. The system includes a reader station 110 and a plurality of electronic tags (shown are 120, 122, and 124). If so desired more than one reader station may be used. The reader station and electronic tags can communicate with each other. Data can be exchanged in either direction. Preferably, the communication is wireless/contactless in a way known from or similar to wireless/contactless ID cards like the Philips Mifare system. In such systems the reader station and tags are each equipped with an antenna. Typically, the reader station also provides power to the tag via the antenna. Advantageously, a communication technique is used that allows multiple tags to be in the vicinity of the reader station without disabling communication. Such communication systems and communication techniques are well-known and are not the subject of the invention, but may be used in the system according to the invention. If so desired, the communication may also be based on making contact, e.g. using conventional smart-card contacts. Contactless and contact-based communication systems may thus both be used as alternatives or together.

Figure 2:
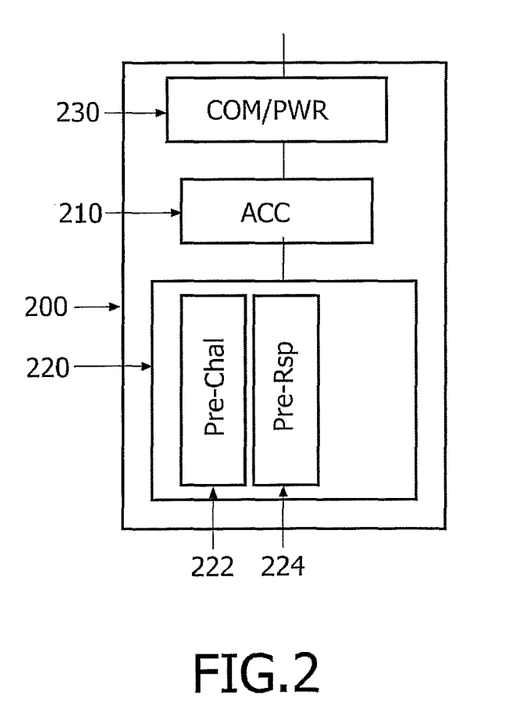
FIG. 2 shows a block diagram of an embodiment of an electronic tag according to the invention.

FIG. 2 shows a block diagram of an electronic tag 200 according to the invention. It will be appreciated that only elements relevant for the invention are shown in more detail. Elements such as an antenna, power circuitry, communication circuitry, etc are illustrated using block 230 and are in itself well-known. Each of the electronic tags 200 includes a memory 220. The memory 220 includes a first memory location 222 for storing a pre-computed challenge and a second memory location 224 for storing a pre-computed response that is associated with the challenge, for example based on a predetermined cryptographic challenge-response algorithm or by being two (pseudo-)random numbers that are associated with each other by the system. The tag 200 also includes an access circuit 210 for only providing the response stored in the second memory location 224 in response to receiving a challenge that matches the challenge stored in the first memory location 222. The access circuit 210 may be implemented in any suitable way. For example, the tag may be command driven. Upon receiving a command 'provide the response' that carries as a parameter the challenge, the access circuit may use a comparator that checks the received parameter against the challenge stored in memory location 222. If this matches, it may use a conventional read circuit to read the response value from the memory location 224 and provide this as a response to the command. The command decoding/response encoding may be part of the access circuit or be in a different part of the tag 200. Encoding/decoding of commands/responses is well-known and will not be described any further. The first memory location 222 is non-readable from outside the tag. This may be achieved in any suitable way, for example by ensuring that the memory location is not wired/switched to an interface to outside the tag. Preferably, the access circuit 210 is also responsible for controlling access to the first memory location, for example using a state machine. Such state machine may be operated using permanently stored state parameters. For this purpose the memory 220 may be extended with some bits to store the state. It will be appreciated that the described data needs to be stored for possibly prolonged periods. To this end, preferably non-volatile memory is used, such as EEPROM or flash memory. Also other suitable memory types may be used, such as MRAM.

Figure 3:
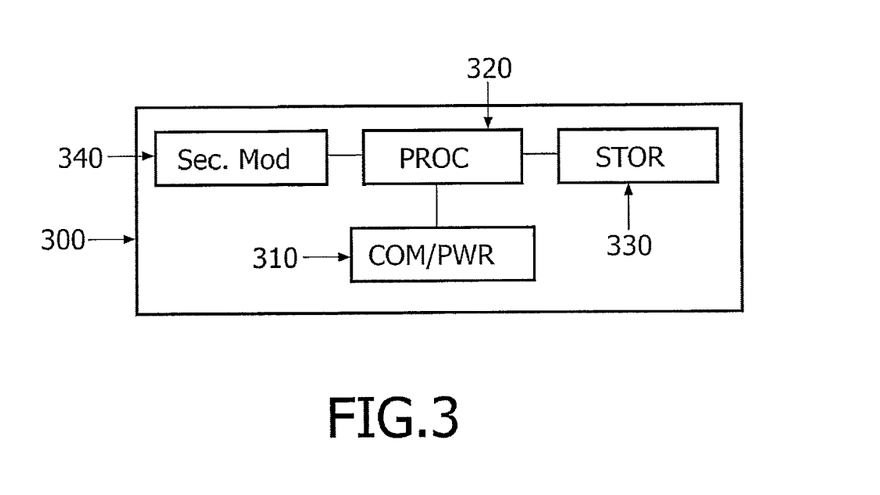
FIG. 3 shows a block diagram of an embodiment of a reader station according to the invention.

FIG. 3 shows a block diagram of an exemplary reader station 300. Block 310 illustrates elements such as an antenna, power circuitry, communication circuitry, etc. that are used for communication with and, optionally, powering the electronic tag. As such block 310 is the counterpart of block 230 of FIG. 2. Such elements are in itself well-known and will not be described here any further. The reader station 300 provides a challenge-response verification, e.g. by performing the selected challenge-response protocol or by checking whether the received response matches the response that according to the system is associated with the challenge. To this end, the reader station 300 may be equipped with a processor 320 that is operated under control of a suitable program. Any suitable processor may be used, for example like those used in personal computers. The program may be stored in a storage 330, such as a hard disc, optical storage medium (e.g. CD-ROM, DVD-ROM, DVD+RW, etc.), solid state memory, such as ROM, flash or other suitable non-volatile storage. Critical cryptographic computations and data (e.g. key) are preferably performed/stored in a secure module 340, such as a cryptographic smart-card. The reader station itself may be based on a conventional computer, such as a desktop PC or laptop PC enhanced with the modules 310 and 340.

Figure 4:
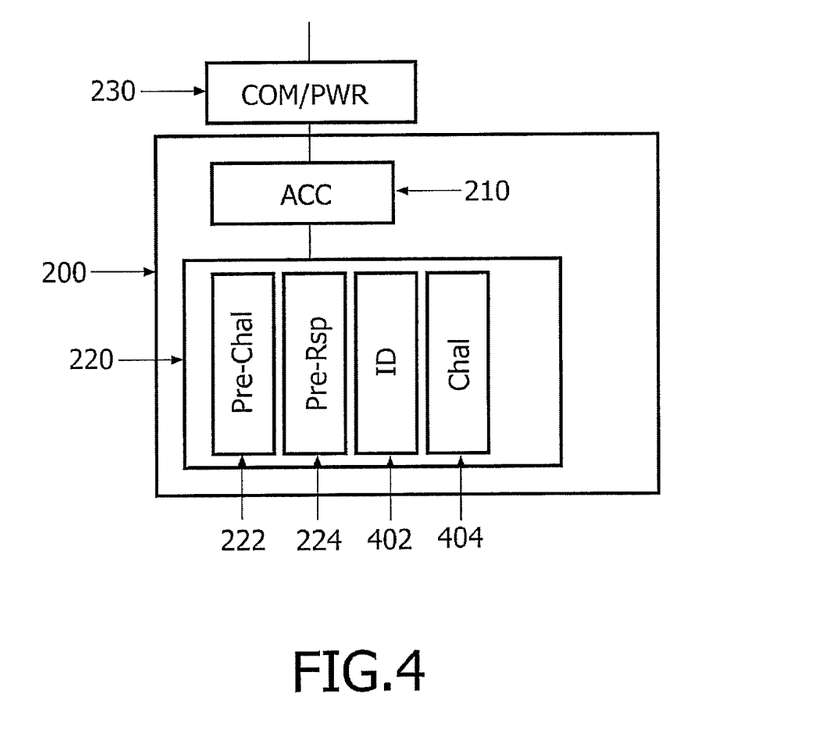
FIG. 4 shows a block diagram of a second embodiment of an electronic tag according to the invention.

Each of the electronic tags is associated with a unique identity (ID). The purpose of this ID is to make the tag uniquely identifiable within the scope of the system. This can be achieved by using a universally unique ID for each tag. In the embodiment of FIG. 4 such an ID is stored in the tag itself, in memory location 402. This makes it very easy for the reader station to obtain the ID (e.g. by simply performing a read operation on a predetermined memory address that corresponds to the memory location 402). Write access to this location should not be possible from outside. In principle, the ID may be read freely. Preferably, during manufacturing of the tag a unique ID is stored in the tag in a part of the memory that is read-only.

The ID need not be universally unique. In principle, it is sufficient if the tag is unique within the boundary of the actual system in which it is used (e.g. for the event in which it is used). Other measures may be taken to ensure that a tag can only be used for one system (e.g. using visual identification on the tag). In a preferred embodiment, a cryptographic technique is used to ensure that, although a tag is only unique within one system, the challenge is nevertheless universally unique. For example, the ID is encrypted under control of a key that is unique for the system. The challenge is then based on the encrypted ID. Any suitable encryption system may be used. The key may be chosen randomly or using a suitable pseudo-random generator.

A universally unique ID may also be created by combining two (or more) fields. A first field can then be used to identify the system/application and can be set during manufacturing, resulting in a batch of same tags. A second field may be used to store an identifier that is unique within the system/application. This field may be written at a later stage. Such a field would then have to be of a write-once type (or appear to be of a write-once type through intervention of the access circuit).

It is convenient that the ID is obtained from a memory within the tag since this allows a fully automatic and fast authentication by the reader station. If so desired, the unique ID associated with the tag may be obtained in other ways. For example, the ID may be printed on the tag in a visually readable manner (e.g. using digits or a bar code). The ID may also be an identifier of the person holding the tag, e.g. an identification code on a passport or driving license.

Figure 5:
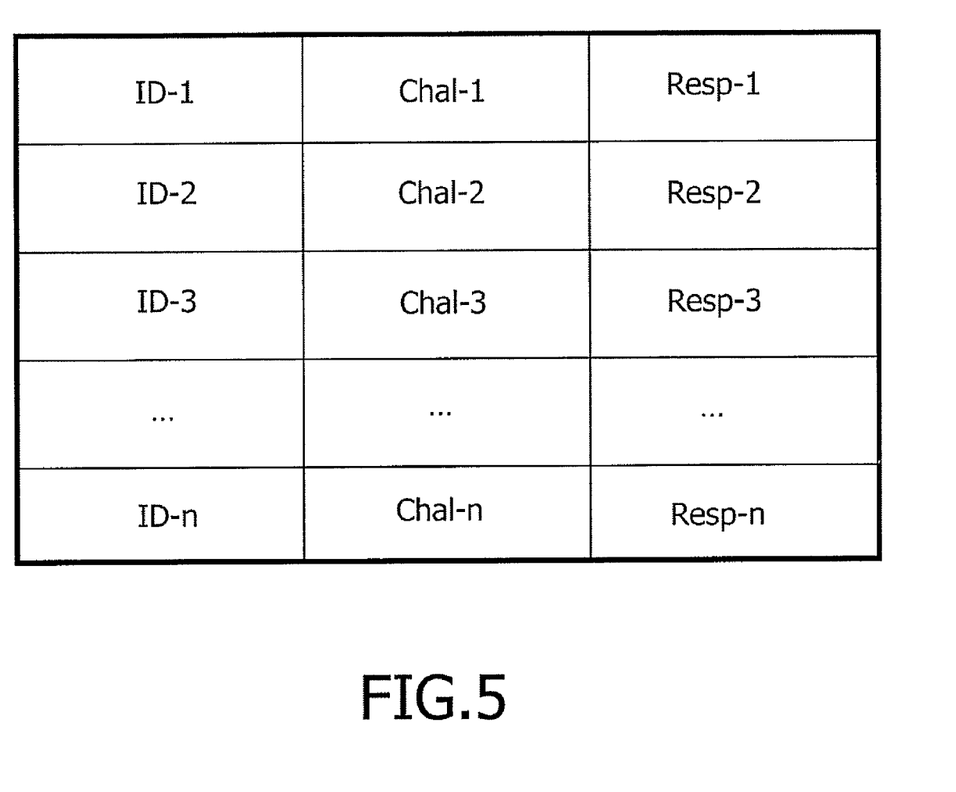
FIG. 5 shows a table that may be used in the reader station.

The reader station obtains for an electronic tag the associated unique identity (e.g. by reading it from memory location 404). The reader station then determines for the identity a corresponding challenge. In a cryptographic challenge-response system, the party (the verifier, i.e., reader station) that wants to establish the identity of someone else, sends the other party, (the prover, i.e., electronic tag), a message. This message is called a 'challenge'. To this challenge there is only one valid response. When a valid response has been received, the verifier is convinced of the other party's identity. For this system to work, the challenge that is issued needs to be different every time the protocol is performed (requiring a different response, too), otherwise an attacker could easily impersonate the prover. A challenge-response system can be implemented using both public-key techniques and symmetric secret-key techniques. In the first case, the verifier needs to know in advance the public key belonging to the prover (e.g., from a public-key certificate). In the second case, the verifier and prover have to share a secret key. The authentication is then based on the fact that the prover is able to 'decrypt' the challenge from the verifier and generate a valid response based on the private/secret key. A well-known example of a challenge-response system is the Guillou-Quisquater identification protocol (U.S. Pat. No. 5,140,634 by Philips). This algorithm may be used, but other suitable algorithms may also be used. Once a challenge-response protocol has been chosen, the exact number of bits required for the challenge may also be known or selectable by an operator of the system. The system 100 may have generated a sufficient number of unique challenges, one for each possible tag to be used in the system. It can then create a table that matches the tag's ID to the associated challenge. By obtaining the ID, the corresponding challenge can thus be read from the table. In such an arrangement, such a table is preferably kept secure (e.g. in module 340). The table can be extended further by also adding the response that is associated with the challenge. The response may be associated via a chosen challenge-response protocol, but there may also be another association, such as associating two random numbers. Such a table is shown in FIG. 5. For each tag one row in the table is used. The first field shows the ID associated with the tag. Once the reader station has obtained this ID for the tag, it uses this ID to search through the first column and find the involved row. It then sends the challenge to the tag. It can in this embodiment obtain the challenge from the second column of the located row. If the tag considers the challenge acceptable, the reader station receives a response from the tag. The reader station then verifies the authenticity of the tag by comparing the received response to a response that corresponds to the challenge based on the chosen cryptographic challenge-response protocol. Using the table of FIG. 5 it can simply retrieve the expected (=acceptable) response from the third field of the row.

FIG. 4 also illustrates a preferred embodiment wherein the memory 220 includes a fourth memory location 404 for storing a challenge. The fourth memory location 404 is writeable from outside the tag (in practice by the reader station). The access circuit 210 is arranged to, in response to a read access to the second memory location 224 from outside the tag (in practice by the reader station), compare the challenge stored in the fourth memory location 404 to the pre-computed challenge stored in the first memory location 222 and to only provide the response stored in the second memory location 224 if the comparison yields a match. In this way, the reader station sees the electronic tag as just an ordinary memory. Persons skilled in the art can easily design such an access circuit.

Figure 6:
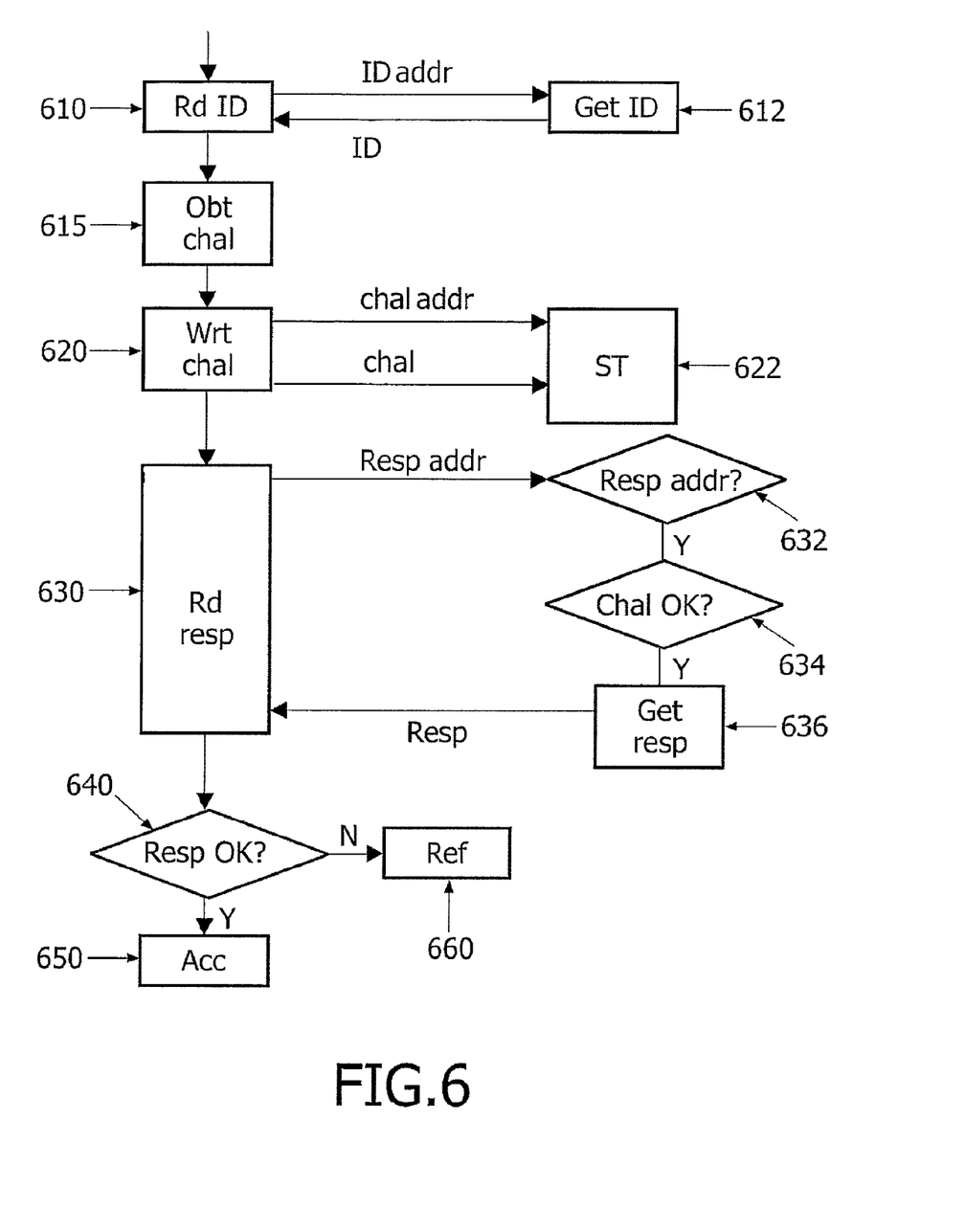
FIG. 6 shows a flow chart of a preferred embodiment.

FIG. 6 shows an exemplary flow chart of the operations in the reader station (left hand side) and tag (right hand side) and the exchange of data for the embodiment described above. In step 610 the reader station obtains the unique identifier, in this example by reading it from the tag. It sends the address (ID addr) of the memory location that holds the ID to the tag. The tag gets the stored identifier (ID) and provides the ID back in step 612. The whole operation may, for example, be a conventional memory read operation. In step 615, the reader station obtains the challenge that is associated with the ID. As illustrated above in FIG. 5, it may do so by reading it from a table. Alternatively, the challenge may be calculated on-the-fly by the reader using an encryption function that operates on the tag ID and a secret cryptographic key k stored internally in the reader station. In such an embodiment, the reader station needs not to store long lists of challenges and corresponding responses, but needs only to keep the key k secret. Any suitable cryptographic algorithm may be used, such as the standard block-cipher algorithm Triple DES or AES. In step 620, the reader station provides the challenge to the tag, in this example in the form of a memory write operation: it provides the address (chal addr) of the memory location that is used for storing the provided challenge and it provides the actual challenge value (chal). In step 622, the tag stores the value. In step 630 the reader station tries to get the response from the tag, in this example by reading it from the tag. It sends the address (Resp addr) of the memory location that holds the response to the tag. The tag is triggered by a read operation of the response address. As described above, it only provides the response conditionally. The test is done by the access circuit 210. In this example that is illustrated by the test 632 that checks that the supplied address is the address of the memory locations that holds the response. If so, in step 634 it checks whether the challenge that was received in step 622 matches the pre-stored challenge stored in location 222. If so, the tag gets the pre-stored response from location 224 and provides the response back in step 636. In step 640, the reader station checks whether the received response matches the expected response (according to the predetermined challenge-response protocol). The expected response may be pre-computed as illustrated in FIG. 5 or may be generated on-the-fly using the protocol. If the received and expected response match, the tag is considered authentic and further steps 650 for such a tag may be take, such as granting access to an event. If not, the tag is refused in step 660.

Figure 7:
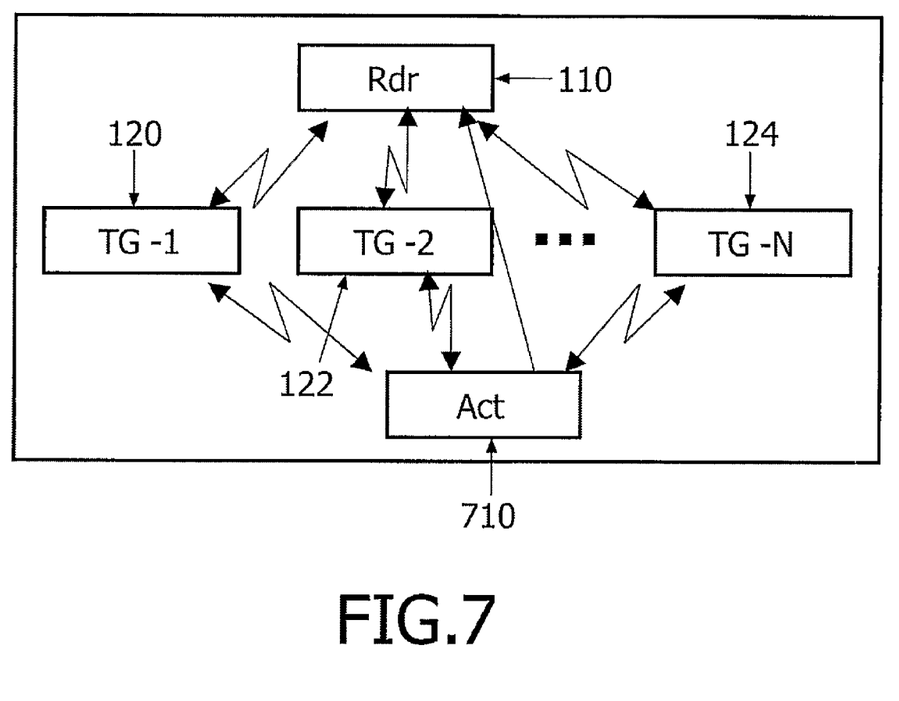
FIG. 7 shows a block diagram of an embodiment of the system according to the invention.

FIG. 7 shows a block diagram of a further embodiment of the system according to the invention. In this embodiment, a unique identifier has already been associated with the tag (e.g. already stored in the tag during the manufacturing). In this embodiment, the system includes an activator 710. The activator 710 further 'programs' the tags. A dedicated activator 710 may be used for each event/application. The activator 710 obtains for the electronic tag the associated unique identity, for example by reading it from the memory location 402. To this end, the activator 710 would then need the hardware/software to communicate with the tag and, where applicable, provide power to it. The activator 710 then determines for the identity a corresponding challenge. The challenge must be suitable for the chosen challenge-response protocol (if used at all) and may be chosen randomly. The activator then stores the challenge in the first memory location 222 of the electronic tag 200. This memory location is preferably of a write-once type. Any suitable implementation of a write-once type may be used. If so desired, a state machine in the access circuit 210 may be used to register that the location 222 has been written to and to lock any further write and read access to this location. The activator 710 also determines a response that is associated with the challenge (e.g. based on the predetermined challenge-response algorithm). The activator 710 stores the computed response in the second memory location 224 of the tag. Preferably this memory location 224 is also of a write-once type. The activator 710 provides to the reader station 110 for each tag of the system the following information: ID and challenge. If the reader station does not compute the response itself, the activator 710 preferably also provides the response to the reader station 110.

Preferable, the access circuit is arranged to provide only once access from outside the tag to the response stored in the second memory location 224, ensuring maximum security. The access circuit may do this by using a state machine that registers whether already successful access has been granted to the response in location 224. If so, further access is always denied. For systems with reduced security requirements, a higher number of access may be granted, e.g. three times. The maximum number of times that access may be granted may be stored in a memory location that can not be written from the outside (or only once to set the number). A counter may be used to register the number of times of successful access and the state machine may refuse further access after the maximum allowed number has been reached.

Figure 8:
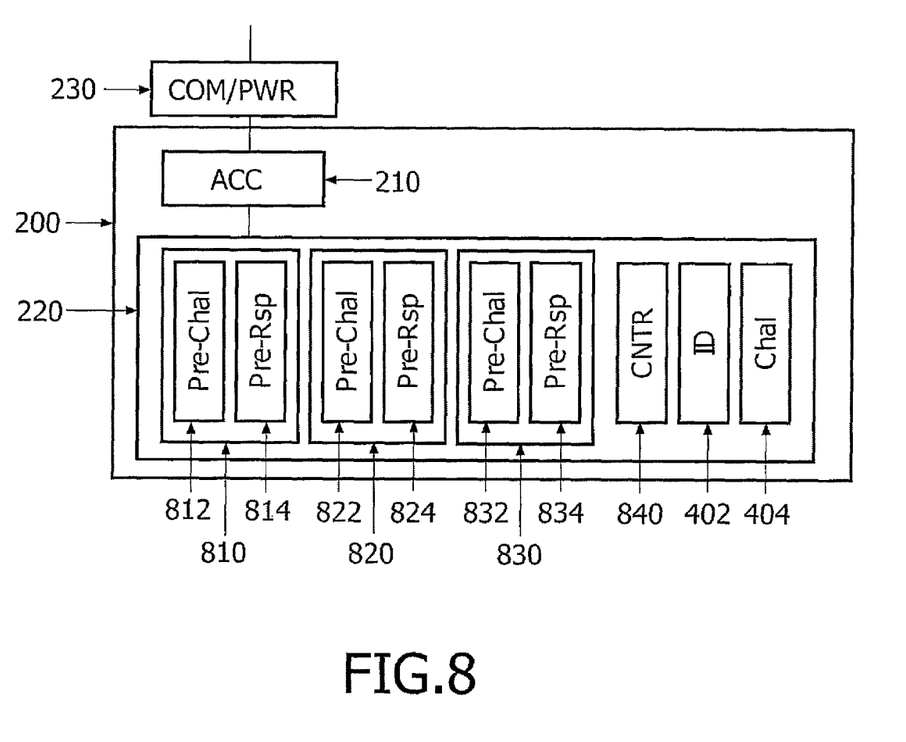
FIG. 8 shows a block diagram of a third embodiment of an electronic tag according to the invention.

FIG. 8 shows a block diagram of a further embodiment of the system according to the invention, wherein the memory 220 of the electronic tag includes a plurality of pairs of memory locations. Shown are the pairs 810, 820 and 830. A first memory location 812, 822, 832 of each pair is used for storing a predetermined challenge and a second location 814, 824, 834 of each pair is used for storing a predetermined response. The response is associated with the challenge (e.g. based on a predetermined cryptographic challenge-response algorithm). Similar to as described with respect to FIG. 1, each of the first memory locations 812, 822, 832 is non-readable from outside the tag. The access circuit 210 is arranged to provide the response stored in the second memory location of a pair only in response to receiving a challenge that matches the challenge stored in the first memory location of the same pair. It can thus perform the same operation as described for FIG. 2 now for each pair. The pairs may be seen as fully independent, e.g. the reader station would be free to access any one at its own choosing. This may be useful in particular for applications where the pairs have there own specific function (e.g. each providing access to a different area of a main event) and there is no prescribed sequence.

In a preferred embodiment, the pairs of memory locations are sequentially arranged in the sense that they are used sequentially. The access circuit starts with being willing to provide access to the response of a first one of the memory pairs. Each time a response has been provided in response to a received valid challenge, the access circuit automatically selects a sequentially next pair for a subsequent access operation.

It will be appreciated that the challenge and response need to be of a suitable bit size to avoid brute force attacks. Depending on the application, a skilled person can choose the size. Factors that influence this are: the duration that a tag is available to an attacker before actually being used (for example, tags are distributed one month before the event), the speed of the communication and processing of the tag, and the number of tags that could be analyzed in parallel by an attacker. The skilled person can then easily calculate the number of bits that would give an acceptable level of security. The skilled person will also be aware that timing attacks should be prevented. In such an attack, the attacker sends a random challenge to the tag. The tag processes the challenge, including comparing this challenge to the stored pre-computed challenge. If the response time depends on the processing of the tag (e.g. the number of bits that match), this provides information to the attacker. An increased response time may mean that more bits are correct. It is therefore desired that the response time is fixed. Person skilled in the art of cryptographic circuits are aware of this and know how to design suitable circuits.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. The carrier can be any entity or device capable of carrying the program. For example, the carrier may include a storage medium, such as a ROM, for example a CD ROM or a semiconductor ROM, or a magnetic recording medium, for example a floppy disc or hard disk. Further the carrier may be a transmissible carrier such as an electrical or optical signal which may be conveyed via electrical or optical cable or by radio or other means. When the program is embodied in such a signal, the carrier may be constituted by such cable or other device or means. Alternatively, the carrier may be an integrated circuit in which the program is embedded, the integrated circuit being adapted for performing, or for use in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device/system claims enumerating several means, several of these means may be embodied by one and the same item of hardware. The mere fact that certain measures are recited in mutually different dependent claims does not indicate that a combination of these measures cannot be used to advantage.

The invention claimed is:

1. An authentication system including a plurality of electronic tags and at least one reader station for verifying an authenticity of an electronic tag;

each of the electronic tags being associated with a respective unique identity and including:
a memory including a first memory location for storing a pre-computed challenge and a second memory location for storing a pre-computed response that is associated with the pre-computed challenge; the first memory location being non-readable from outside the electronic tag; and
an access circuit configured to only provide the pre-computed response stored in the second memory location in response to receiving a challenge that matches the pre-computed challenge stored in the first memory location;

each of the reader stations being operative to, for an electronic tag:
obtain the respective unique identity;
determine for the respective unique identity a corresponding challenge;
send the corresponding challenge to the electronic tag;
receive a response from the electronic tag; and
verify the authenticity of the electronic tag by comparing the received response to a response that is associated with the corresponding challenge.

2. The authentication system as claimed in claim 1, wherein the memory of the electronic tag includes a third memory location for storing the respective unique identity associated with the electronic tag; the third memory location being of a read-only type; each of the reader station being operative to obtain the respective unique identity associated with the electronic tag by reading the respective unique identity from the memory of the electronic tag.

3. The authentication system as claimed in claim 2, wherein the memory includes a fourth memory location for storing a challenge; the fourth memory location being writeable from outside the electronic tag; the access circuit being arranged to, in response to a read access to the second memory location from outside the electronic tag, compare the challenge stored in the fourth memory location to the pre-computed challenge stored in the first memory location and to only provide the pre-computed response stored in the second memory location if the comparison yields a match.

4. The authentication system as claimed in claim 1, wherein the first and second memory location being of a write-once type; the system further including
an activator operative to, for the electronic tag:
obtain the respective unique identity;
determine for the respective unique identity a corresponding challenge;
store the challenge in the first memory location of the electronic tag;
determine a response that is associated with the challenge; and
store the response in the second memory location of the electronic tag.

5. The authentication system as claimed in claim 1, wherein the corresponding challenge for the respective unique identity is determined using a predetermined cryptographic algorithm operating on at least the respective unique identity and a cryptographic key.

6. The authentication system as claimed in claim 1, wherein the access circuit is arranged to provide access from outside the electronic tag to the pre-computed response stored in the second memory location a maximum of one time.

7. The authentication system as claimed in claim 1, wherein the memory includes a plurality of pairs of memory locations; each pair including a respective first memory location for storing a predetermined challenge and a respective second memory location for storing a predetermined response that is associated with the pre-computed challenge in the first memory location of the same pair; each of the first memory locations being non-readable from outside the electronic tag; the access circuit being arranged to provide the pre-computed response stored in the second memory location of a pair only in response to receiving a challenge that matches the challenge stored in the first memory location of the same pair.

8. The authentication system as claimed in claim 7, wherein the plurality of pairs of memory locations are sequentially arranged and the access circuit being operative, starting with a first one of the memory pairs, each time a response has been provided in response to the received challenge, select a sequentially next pair for a subsequent access operation.

* * * * *